Figure 1:
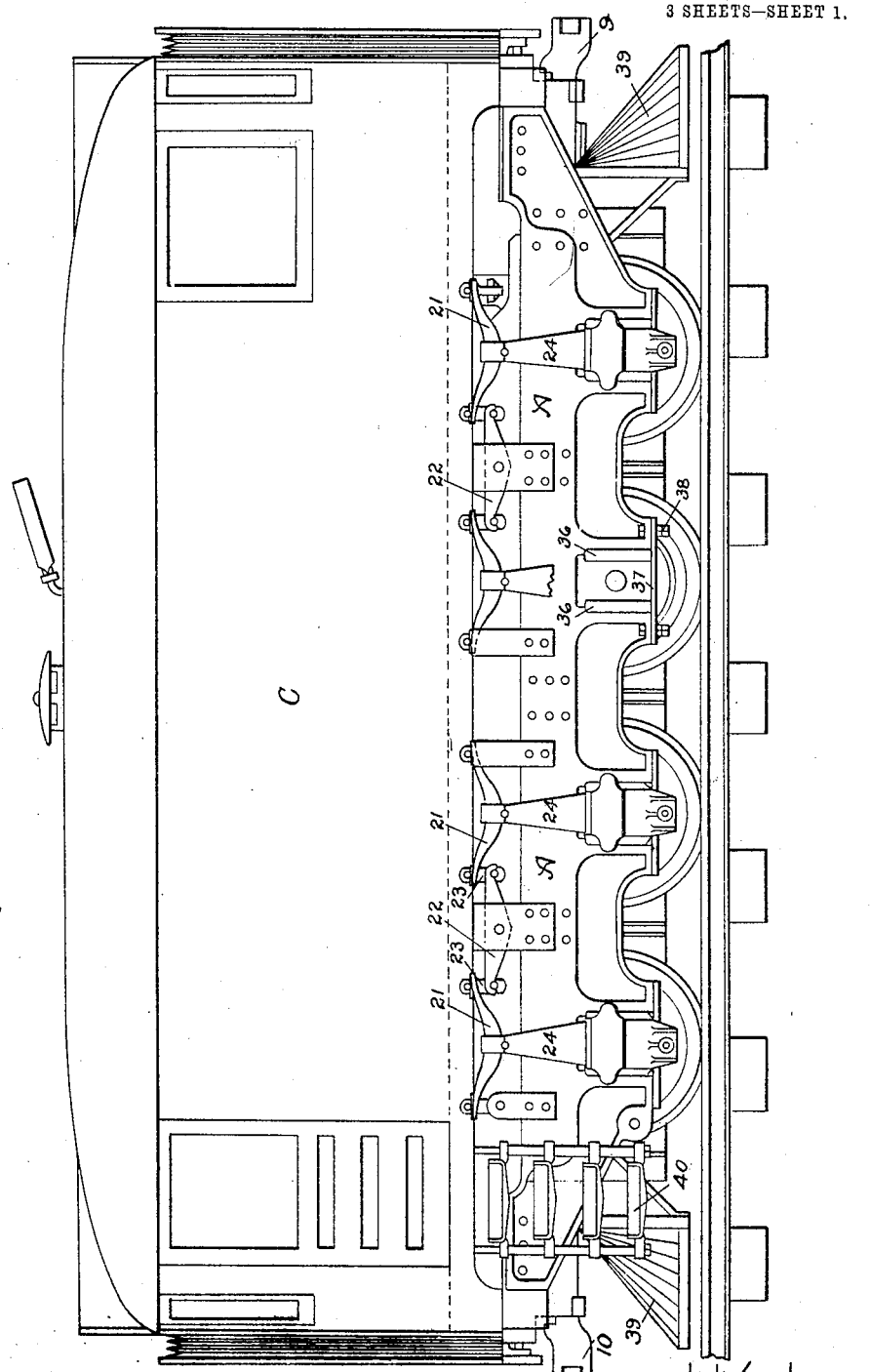

No. 808,717. PATENTED JAN. 2, 1906.
A. F. BATCHELDER.
ELECTRIC LOCOMOTIVE.
APPLICATION FILED NOV. 12, 1903. RENEWED JUNE 14, 1905.

3 SHEETS—SHEET 1.

No. 808,717. PATENTED JAN. 2, 1906.
A. F. BATCHELDER.
ELECTRIC LOCOMOTIVE.
APPLICATION FILED NOV. 12, 1903. RENEWED JUNE 14, 1905.

3 SHEETS—SHEET 2.

Fig. 2.

WITNESSES:

INVENTOR:
Asa F. Batchelder,
by Albert S. Davis
Atty.

No. 808,717. PATENTED JAN. 2, 1906.
A. F. BATCHELDER.
ELECTRIC LOCOMOTIVE.
APPLICATION FILED NOV. 12, 1903. RENEWED JUNE 14, 1905.

3 SHEETS—SHEET 3.

WITNESSES:

INVENTOR:
Asa F. Batchelder,
by Albert H. Davis
Atty.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC LOCOMOTIVE.

No. 808,717.     Specification of Letters Patent.     Patented Jan. 2, 1906.

Application filed November 12, 1903. Renewed June 14, 1905. Serial No. 265,240.

*To all whom it may concern:*

Be it known that I, ASA F. BATCHELDER, a citizen of the United States, residing at Schenectady, in the county of Schenectady and State of New York, have invented certain new and useful Improvements in Electric Locomotives, of which the following is a specification.

My invention relates particularly to the construction of electric locomotives, and comprises a novel construction of the frame or body of the truck on which the superstructure of the locomotive is mounted, which renders possible the utilization of the frame as the field-magnet structure for the propelling-motors.

It also includes a novel arrangement of the magnetic circuits of the propelling-motors and a novel mounting of the operative parts of the motors, which latter feature renders possible the removal of a greater part of the dead-weight of the motors from the axles. In this connection a further feature of my invention consists in so shaping the pole-pieces of the motors as to permit a free movement of the pole-pieces with reference to the motor-armatures as the axle-boxes play up and down in their bearings, and an additional feature consists in so shaping the pole-pieces and so mounting the axle-boxes in the frame that the motor-armatures may be mounted on the driving-axles and may be removed for the purpose of making repairs and renewals by simply lowering the axles with their wheels and armatures mounted thereon without disturbing any other part of the locomotive.

My invention also comprises further features, as will more clearly appear from the following description and the claims annexed thereto.

While my invention relates particularly to the construction of electric locomotives, certain of its features are applicable to dynamo-electric machines generally, and I aim in the claims hereto appended to cover these features broadly as applied to the structure of dynamo-electric machines, as well as their application to the construction of electric locomotives.

In embodying the several features of my invention in the construction of an electric locomotive I make the frame or body of the truck constitute the field-magnet structure of the motors, and I so locate and arrange the pole-pieces and the other members of the field-magnet structure that the magnetic circuit for all the motors extends through the pole-pieces and thence through the frame, thus providing a magnetic circuit common to all of the armatures. I then arrange and connect the field-windings of the motors so that they will produce a magnetic flux in this common magnetic circuit. In this connection I also employ as an additional feature means for confining any differences of flux in the different armature-fields to their respective fields, so that all the motors will perform an equal amount of work notwithstanding any variations of operating conditions. This is accomplished specifically by so constructing the field-magnet structure that each armature-field has in addition to the common magnetic circuit a local magnetic circuit adapted to carry any excess of flux over that carried in the common circuit, thus maintaining the differences in field strength caused by the different conditions under which the individual machines work. The motor-armatures are mounted directly on the axles, and the frame or body of the truck is spring-supported from the axle-boxes. The pole-pieces are located in the plane of revolution of the motor-armatures and are cut away at the pole-tips so as to permit a free movement of the pole-pieces with reference to the motor-armatures as the axle-boxes play up and down in their bearings, and in the preferred form of my invention the axles are removable from their bearings in a downward direction and the pole-pieces are provided with substantially plane faces or at least are cut away sufficiently to permit the removal of the axles, with the wheels and armatures mounted thereon, by lowering the complete elements from the truck-frame without disturbing the field-windings or any other parts of the locomotive.

Figure 3:
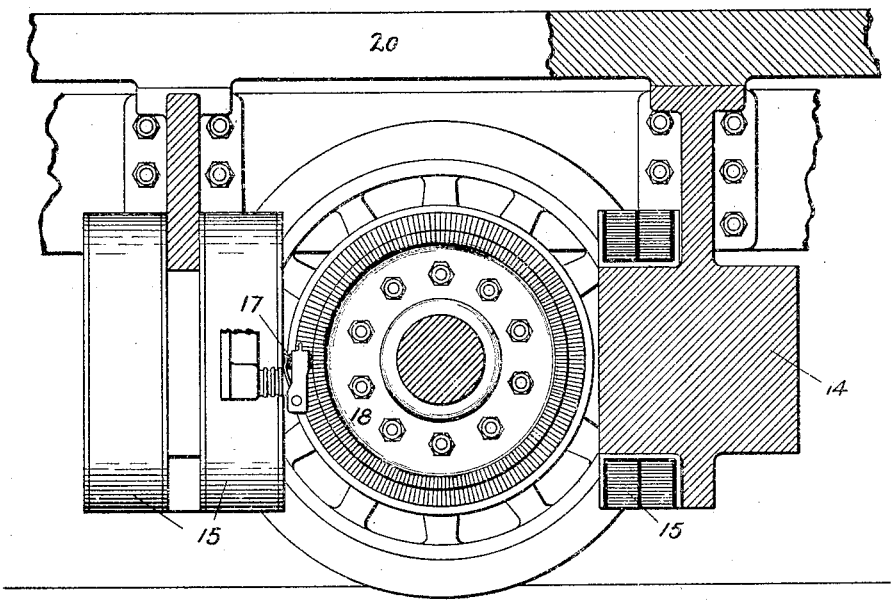
Figure 4:
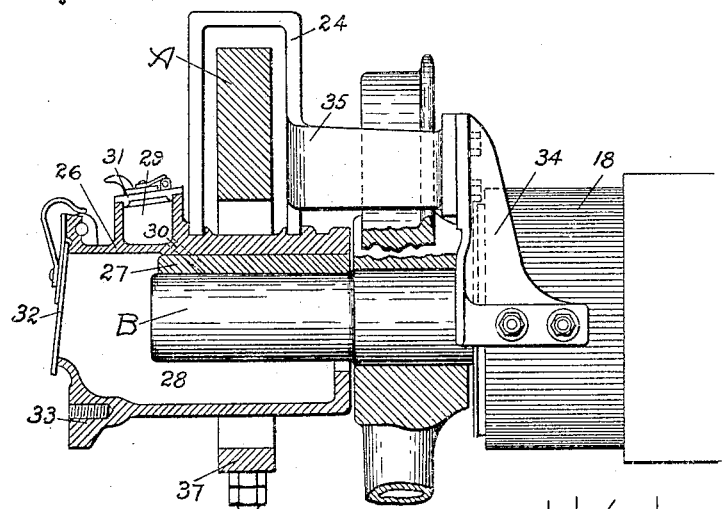

In the accompanying drawings, which are to be considered in connection with this description, Figure 1 is a side elevation of an electric locomotive embodying the features of my invention. Fig. 2 is a plan view of the frame or truck of the locomotive with parts broken away to show the manner of supporting the commutator-brushes and other details. Fig. 3 is a fragmentary view illustrating, partly in section, the fields and armature of one of the driving-motors, also showing the position of one of the commutator-brushes; and Fig. 4 is a vertical section of a journal-box and the surrounding structure, showing in detail one of the brush-holders and a portion of its supporting-yoke.

Referring in detail to the drawings, A designates the main frame or body of the locomotive-truck, which is suitably supported upon a plurality of wheeled axles B B and in turn supports the cab C. This frame comprises longitudinal side bars 1 2, which are composed of magnetic material and which are connected together at their ends by end members 3 4 5 6, also composed of magnetic material. These end members support suitable frames or casings 7 8 for the reception of suitable draw-bars 9 10. Intermediate transverse members 11, 12, and 13 connect the longitudinal bars 1 and 2 at points between the axles B B. Pole-pieces 14 14 are located on opposite sides of each of these intermediate transverse members and to the inner sides of the end members 3 and 4 and may be secured thereto in any approved manner or cast integral therewith, as shown in the drawings. The armatures 16 of the driving-motors are located directly upon the axles B B and in operative relation to the pole-pieces 14 14. Suitable brushes 17 17 engage the commutators 18 of the several armatures, and the field-coils and armature of each motor are adapted to be connected in series and the windings of the several motors in various combinations through the agency of a suitable controller, (not shown,) as is common in series-parallel systems of control.

Now if we consider any given motor—as, for example, the motor D in Fig. 2—as soon as its field-coils 15 15 are energized magnetic lines of force travel through a circuit extending from the right-hand pole-piece through the armature to the other pole-piece, there dividing and passing in opposite directions through the adjacent transverse member 11 to the side bars 1 and 2, returning by way of the side bars and transverse member 12 to the starting-point, as indicated by the double-headed arrows in Fig. 2. If now the field-coils of two adjacent motors be energized in such a manner as to produce magnetomotive forces in the same direction, the magnetomotive force in the transverse member between the motors produced by one set of field-coils will be in the opposite direction to that produced by the other set and if the operating conditions be the same will be equal to it and neutralize it. Under such conditions, then, there is no flux in the common transverse member; but the magnetic circuit at that point will extend directly between the pole-pieces on its opposite sides. Similarly, if all the field-coils are arranged to produce magnetomotive forces in the same direction and are simultaneously and equally excited the intermediate members 11, 12, and 13 will carry no flux, but the magnetic circuit will extend directly through all the pole-pieces to the end members and there dividing be completed through said end members and the side bars of the main frame, as indicated by the single-headed arrows in Fig. 2.

From the above it will be apparent that if the flux for each of the motor-fields is identical the intermediate transverse members 11, 12, and 13 need not be composed of magnetic material, since they will not be required to carry any lines of force. However, if it should happen that the working condition of one of the motors was such as to require a stronger field than the others—as, for example, if the driving-wheels driven by it were slightly larger in diameter than the other driving-wheels, so that its armature would travel at a lower speed than the others—then the excess of flux of that motor-field would be confined to the local magnetic circuit formed by the adjacent transverse members and the side bars without in any way affecting the fields of the other motors, such local circuit corresponding to that previously referred to and indicated in the case of the motor D by double-headed arrows.

In addition to the members of the frame thus far described are longitudinal members 19 and 20, which extend between the end members 3 and 4. These members are preferably composed of magnetic material and form a part of both the main magnetic circuit and the local circuits, as will be apparent from the drawings and the description previously given. In the present case these members 19 and 20 are not symmetrically disposed upon the frame A, but the member 19 is located at one side of the center in order to balance the weight of the pole-pieces on the other side.

The frame A, as previously indicated, is yieldingly or elastically mounted upon the axles B B through the agency of leaf-springs 21 21. These springs are arranged in four pairs, two pairs on each side of the frame. An equalizing-bar 22 for each pair is pivotally secured at its center to the main frame and connected at its ends by links 23 23 to the inner ends of the springs 21 21, which are suitably connected at their outer ends to the frame. These latter connections in the case of one spring of one set on each side of the main frame are made through an equalizing-bar 25, which is pivotally mounted at its center point upon the longitudinal member 20 and is connected at its opposite ends to the outer ends of said springs 21 and, as is common in locomotives, operates to transmit any strain applied to the springs on one side of the vehicle to those located on the other side. The center portions of the springs 21 rest in saddles 24, which straddle the side bars 1 2 and rest upon the upper side of suitable journal-boxes 26. These boxes may be of any preferred construction, such as illustrated in Fig. 4, and, as there shown, each comprises a brass 27, which engages the upper side of the axle B, and a chamber 28, adapted to contain waste and oil for lubricating. In the present instance the journal-box is also provided with an oil-cup 29, having a feed-opening 30 leading through the brass to the upper side of the axle B. Suitable covers 31 and 32 permit access to the oil-cup 29 and the waste-chamber 28, and a tapped lug 33 at the lower outer edge of the journal-box is provided for the connection of a third-rail contact-shoe, if desired.

The commutator-brushes 17 are suitably supported by brush-holders 34, one of which is shown in detail in Fig. 4, which are bolted or otherwise secured to the yoke 35, which straddles the adjacent driving-wheel and is suitably secured to the adjacent saddle or formed integral therewith, as shown in the drawings.

From the above it will be apparent that the armatures 16, which are mounted directly upon the axles B B, have a movement relative to the main frame, so that where the pole-pieces 14 14 are mounted so as to partake of the movement of the frame A the polar faces must be so shaped as not to interfere with the movement of the armatures. In the present instance I have shown these polar faces as vertical plane surfaces; but it is apparent that polar faces of other configuration might also be employed, since it is only necessary that no part of any pole-piece projects into the path of the armature, and where the polar face is broad and the relative movement of the armature small it may be sufficient to have a portion only of the polar face substantially parallel to the direction of movement of the armature; but in this case, of course, the armature cannot be removed in the manner heretofore described. By reason of the yokes 35 being connected rigidly to the saddles 24 the brushes 17 partake of the movement of the armature relative to the pole-pieces.

The journal-boxes 26 26, which are adapted to bear against the jaws 36 in the under side of the side bars 1 and 2, are held in place by bars 37, which are bolted to the under side of the side bars of the main frame A. With this construction, when it becomes necessary for any reason to remove one of the armatures of the locomotive the locomotive is run over a pit, the bars 37 are unbolted, and the axle-wheels and armature are lowered as a unit from their position without interfering or otherwise disturbing the field structure or other parts of the locomotive.

The locomotive is also provided with suitable fenders 39 39 and steps 40.

In the description and claims I use the term "pole-piece" to define that end of the field-magnet core adjacent to the armature, irrespective of whether the same is integral therewith or not. It should also be noted that as to certain features of my invention it is not necessary that the frame or body of the truck should constitute the field-magnet structure or that the motors should have a common magnetic circuit, although this is the preferred construction, and even when the frame does constitute the field-magnet structure all the members of the main frame A need not be composed of magnetic material, nor need the side bars 12 be composed of such material throughout, since it is sufficient if enough of the members of the main frame be composed of magnetic material to complete the main magnetic circuit which extends through the pole-pieces. In other words, although my invention in its preferred form as applied to an electric locomotive comprises all the features heretofore described, it is to be understood that the several features are capable of independent use and that the present disclosure sets forth only one embodiment of my invention. I therefore do not wish my invention to be unduly limited, since many of its features are capable of extended and varied application. I aim to cover by the terms of the appended claims all modifications and variations which fall within the spirit and scope of my invention.

What I claim as new, and desire to secure by Letters Patent of the United States, is—

1. A field-magnet structure for dynamo-electric machines, comprising an inclosing frame, one or more transverse members joining opposite sides of said frame, a plurality of pole-pieces secured to said inclosing frame and said transverse member or members, and field-windings arranged to produce a magnetic flux in a magnetic circuit common to all of said pole-pieces.

2. A field-magnet structure for dynamo-electric machines, comprising an inclosing frame with one or more transverse members joining opposite sides of said frame, the ends of the said frame and the transverse members being provided with pole-pieces, in combination with armatures operatively related to said pole-pieces, and means for producing a magnetic flux in a magnetic circuit common to all of said armatures and pole-pieces.

3. In an electric vehicle, the combination of a truck consisting of a frame having members composed of magnetic material and having pole-pieces for a plurality of armatures, motor-armatures operatively located with reference to said pole-pieces, said pole-pieces and frame members being so located and arranged that a magnetic circuit extends through said pole-pieces and thence through said frame members, and field-windings arranged to produce a magnetic flux in said magnetic circuit.

4. In an electric vehicle, the combination of a truck consisting of a frame composed of magnetic material and having pole-pieces for a plurality of armatures, said pole-pieces being so located and arranged with reference to said frame that a magnetic circuit extends through said pole-pieces and thence through said frame, motor-armatures operatively located with reference to said pole-pieces, and field-windings arranged to produce a magnetic flux in said magnetic circuit.

5. A truck for an electric vehicle, comprising an inclosing frame constituting the field-magnet structure for a plurality of armatures, one or more transverse members joining opposite sides of said frame, a plurality of pole-pieces secured to said inclosing frame and said transverse member or members, and motor-armatures operatively located with reference to said pole-pieces.

6. A truck for an electric vehicle, comprising an inclosing frame constituting the field-magnet structure for a plurality of armatures, transverse members joining opposite sides of said frame, a plurality of pole-pieces secured to said transverse members, and motor-armatures operatively located with reference to said pole-pieces.

7. A truck for an electric vehicle, comprising a frame constituting the field-magnet structure for a plurality of armatures and comprising side bars, end bars, a plurality of transverse members joining said side bars, a plurality of pole-pieces secured to said transverse members, and one or more motor-armatures operatively located with reference to said pole-pieces.

8. In an electric vehicle, the combination of a truck consisting of a frame composed of magnetic material and having pole-pieces for a plurality of armatures, driving-axles journaled in said frame, motor-armatures mounted upon said axles and operatively located with reference to said pole-pieces, said pole-pieces being so located and arranged with reference to said frame that a magnetic circuit extends through said pole-pieces and thence through said frame, and field-windings arranged to produce a magnetic flux in said magnetic circuit.

9. In an electric vehicle, the combination of a truck comprising an inclosing frame constituting the field-magnet structure for a plurality of armatures, one or more transverse members joining opposite sides of said frame, driving-axles journaled in said frame, a plurality of pole-pieces secured to said inclosing frame and said transverse member or members, and motor-armatures mounted upon said axles and operatively located with reference to said pole-pieces.

10. In an electric vehicle, the combination of a truck comprising an inclosing frame constituting the field-magnet structure for a plurality of armatures, transverse members joining opposite sides of said frame, driving-axles journaled in said frame, a plurality of pole-pieces secured to said transverse members, and motor-armatures mounted upon said axles and operatively located with reference to said pole-pieces.

11. In an electric vehicle, the combination of a truck comprising a frame constituting the field-magnet structure for a plurality of armatures, said frame comprising side bars, end bars, a plurality of transverse members joining said side bars, driving-axles journaled in said side bars, a plurality of pole-pieces secured to said transverse members, and motor-armatures mounted upon said axles and operatively located with reference to said pole-pieces.

12. In an electric vehicle, the combination of a truck consisting of a frame constituting the field-magnet structure for a plurality of armatures, driving-axles yieldingly journaled in said frame, motor-armatures mounted upon said axles, and pole-pieces secured to said frame and arranged in operative relation to said armatures.

13. In a dynamo-electric machine having a plurality of armatures, the combination of a field-magnet structure having its pole-pieces and frame arranged so as to provide a magnetic circuit common to said armatures, field-windings arranged to produce a magnetic flux in said common magnetic circuit, and means for confining any differences of flux in the different armature-fields to their respective fields.

14. In a dynamo-electric machine having a plurality of armatures, the combination of a field-magnet structure having its pole-pieces and frame arranged so as to provide a magnetic circuit common to said armatures, field-windings arranged to produce a magnetic flux in said common magnetic circuit, and means for providing local magnetic circuits whereby any differences of flux in the different armature-fields will be confined to their respective fields.

15. In a dynamo-electric machine, the combination with a frame composed of magnetic material, of pole-pieces for a plurality of armatures, said pole-pieces being so located with reference to said frame that a magnetic circuit extends through said pole-pieces and thence through said frame, field-windings arranged to produce a magnetic flux in said common magnetic circuit, and members composed of magnetic material connecting said pole-pieces and said frame.

16. In an electric vehicle, the combination with a truck consisting of a frame composed of magnetic material, of pole-pieces for a plurality of armatures, said pole-pieces being so located with reference to said frame that a magnetic circuit common to said armatures extends through said pole-pieces and thence through said frame, field-windings arranged to produce a magnetic flux in said common magnetic circuit, and means for confining any differences of flux in the different armature-fields to their respective fields.

17. In an electric vehicle, the combination with a truck consisting of a frame composed of magnetic material, of pole-pieces for a plurality of armatures, said pole-pieces being so located with reference to said frame that a magnetic circuit common to said armatures extends through said pole-pieces and thence through said frame, field-windings arranged to produce a magnetic flux in said common magnetic circuit, and means for providing local magnetic circuits whereby any differences of flux in the different armature-fields will be confined to their respective fields.

18. In an electric vehicle, the combination with a truck consisting of a frame composed of magnetic material, of pole-pieces for a plurality of armatures, said pole-pieces being so located with reference to said frame that a magnetic circuit common to said armatures extends through said pole-pieces and thence through said frame, field-windings arranged to produce a magnetic flux in said common magnetic circuit, and members composed of magnetic material connecting said pole-pieces and said frame.

19. A dynamo-electric machine comprising a field-magnet structure having pole-pieces, and an armature rotatable in the plane of the pole-pieces and movable transversely in said plane.

20. A dynamo-electric machine comprising a field-magnet structure having pole-pieces, and an armature rotatable in the plane of, and elastically mounted with relation to, said pole-pieces.

21. A dynamo-electric machine comprising a field-magnet structure having pole-pieces, and an armature rotatable in the plane of the pole-pieces and movable transversely in said plane in a path substantially parallel to the polar faces.

22. A dynamo-electric machine comprising a field-magnet structure having pole-pieces with plane polar surfaces, and an armature operatively rotatable in the plane of said pole-pieces and movable in a plane substantially parallel to said surfaces.

23. In an electric vehicle, the combination of a truck, wheeled driving-axles upon which said truck is yieldingly mounted, a motor-armature for driving one of said axles and mounted so as to partake of the movement of said axle relative to the truck, and a field-magnet structure mounted on said truck and having pole-pieces lying in the plane of rotation of, and operatively related to, said armature and movable relative thereto.

24. A dynamo-electric machine comprising a field-magnet structure having pole-pieces, an armature elastically mounted with relation to and rotatable in the plane of said pole-pieces, and brushes mounted so as to partake of the elastic movement of said armature.

25. A dynamo-electric machine comprising a field-magnet structure having pole-pieces, an armature elastically mounted with relation to and rotatable in the plane of said pole-pieces, a commutator, brushes in operative relation therewith, and means connecting said brushes and armature so as to maintain a fixed relation therebetween.

26. A dynamo-electric machine comprising a field-magnet structure having pole-pieces, yielding-mounted boxes in said structure, an armature having its shaft journaled in said boxes, a commutator for said armature, and brushes mechanically connected to said boxes so as to partake of their movement.

27. A dynamo-electric machine comprising a field-magnet structure having pole-pieces, yielding-mounted boxes in said structure, an armature having its shaft journaled in said boxes, a commutator for said armature, brushes therefor, and a yoke connected to one of said boxes and mechanically supporting said brushes in operative relation to said commutator.

28. A dynamo-electric machine comprising a field structure having pole-pieces and an armature removably journaled in said structure, said pole-pieces being so shaped that the armature may be removed transversely in the plane of the pole-pieces.

29. A dynamo-electric machine comprising a field structure having pole-pieces and an armature removably journaled in said structure, said pole-pieces being so shaped that the armature may be removed transversely in the plane of the pole-pieces and in a path substantially parallel to the polar faces of said pole-pieces.

30. In an electric vehicle, the combination of a frame or truck, a plurality of wheeled axles removably journaled therein, motor-armatures mounted directly upon said axles, and pole-pieces operatively located adjacent to said armatures and so shaped as to permit the ready removal of any axle with its wheels and armature.

31. In an electric vehicle, the combination of a frame or truck, a plurality of wheeled axles journaled therein and removable from its under side, motor-armatures mounted directly upon said axles, and pole-pieces located adjacent to said armatures and so shaped as to permit the ready removal of any axle with its wheels and armature.

32. In an electric vehicle, the combination of a truck or frame, an armature yieldingly journaled in said frame, and pole-pieces secured to said frame in the plane of rotation of, and in operative relation to, said armature and so shaped as to permit a movement of said armature relative to said pole-pieces.

33. In an electric vehicle, the combination of a truck or frame, one or more wheeled axles yieldingly journaled in said frame, one or more armatures mounted on said axles, and pole-pieces secured to said frame in the plane of rotation of, and in operative relation to, said armatures and so shaped as to permit a movement of said armatures relative to said pole-pieces.

34. In an electric vehicle, the combination of a truck or frame, axle-boxes yieldingly mounted in said frame, wheeled axles journaled in said boxes, armatures mounted upon said axles, and pole-pieces secured to said frame in the plane of rotation of, and in operative relation to, said armatures and so shaped as to permit a movement of said armatures relative to said pole-pieces.

35. In an electric vehicle, the combination of a truck or frame of magnetic material, axle-boxes yieldingly mounted in said frame, wheeled axles journaled in said boxes, one or more armatures mounted on said axles, and pole-pieces secured to said frame and having their magnetic circuit or circuits completed therethrough, the said pole-pieces being operatively related to said armatures and so shaped as to permit a free movement thereof with reference to the said armatures as the axle-boxes move in the frame.

36. In an electric vehicle, the combination of a truck-frame, a plurality of wheeled axles yieldingly journaled therein, motor-armatures mounted on said axles, and pole-pieces for said armature located in the plane of rotation of the armatures and carried by the said truck.

37. In an electric vehicle, the combination of a truck-frame, a plurality of wheeled axles yieldingly journaled therein, motor-armatures mounted on said axles, and pole-pieces for said armatures located in the plane of rotation of the armatures and carried by the said truck, the said pole-pieces being constructed to permit a free movement thereof with reference to the said armatures.

38. In an electric vehicle, the combination of a truck-frame, a plurality of wheeled axles removably journaled therein, motor-armatures mounted on said axles, and pole-pieces for the said armatures located in the plane of rotation of the armatures and carried by the said truck, the said pole-pieces being constructed to permit the removal of the said armatures with the axles on which they are mounted in said plane and transversely to said pole-pieces.

39. In an electric vehicle, the combination of a truck-frame, axle-boxes yieldingly mounted in said frame and removable in a downward direction therefrom, wheeled axles journaled in said boxes, armatures mounted on said axles, and pole-pieces for the said armatures located in the plane of rotation of the armatures and carried by the said frame, the said pole-pieces being constructed to permit the removal of the said armatures with the axles on which they are mounted in said plane and transversely to said pole-pieces.

40. In an electric vehicle, a truck-frame constituting the field-magnet structure for a plurality of dynamo-electric machines, a plurality of wheeled axles yieldingly journaled in said frame, and motor-armatures mounted upon one or more of said axles in operative relation to said field-magnet structure.

41. In an electric vehicle, a truck-frame constituting the field-magnet structure for a plurality of dynamo-electric machines, a plurality of wheeled axles yieldingly journaled in said frame, and motor-armatures mounted upon said axles and operatively related to said field-magnet structure.

42. In an electric vehicle, a truck-frame constituting a field-magnet structure for a plurality of dynamo-electric machines, one or more transverse members joining opposite sides of said frame, pole-pieces secured to said transverse members, a plurality of wheeled axles yieldingly journaled in said frame, and motor-armatures mounted on said axles and operatively related to said pole-pieces, the said pole-pieces being constructed to permit free movement thereof with respect to the said armatures as the axles move with reference to the frame.

43. In an electric vehicle, the combination of a truck comprising an inclosing frame constituting the field-magnet structure for a plurality of armatures, one or more transverse members joining opposite sides of said frame, driving-axles yieldingly journaled in said frame, a plurality of pole-pieces secured to said inclosing frame and said transverse member or members, motor-armatures mounted upon said axles and operatively located with reference to said pole-pieces, and field-windings arranged to produce a magnetic flux in a magnetic circuit common to all of said pole-piece and motor-armatures.

44. In an electric vehicle, a wheeled axle, a motor-armature on said axle, a truck-frame constituting the field-magnet structure for said armature, springs located between said axle and said frame to permit a relative vertical movement between said axle and said frame, and polar surfaces on said frame arranged vertically and parallel to the axle.

In witness whereof I have hereunto set my hand this 10th day of November, 1903.

ASA F. BATCHELDER

Witnesses:
BENJAMIN B. HULL,
HELEN ORFORD.